INVENTORS
WOLFGANG OPITZ
HELMUT SPRUCK
KARL HEINZ STEIGERWALD

United States Patent Office 2,944,172
Patented July 5, 1960

2,944,172
APPARATUS FOR WORKING MATERIALS BY MEANS OF A BEAM OF CHARGED PARTICLES

Wolfgang Opitz, Aalen, Wurttemberg, Helmut Spruck, Koenigsbroon, Wurttemberg, and Karl Heinz Steigerwald, Heidenheim (Brenz), Wurttemberg, Germany, assignors to Carl Zeiss, Heidenheim (Brenz), Wurttemberg, Germany Filed Aug. 26, 1959, Ser. No. 836,226
Claims priority, application Germany Aug. 30, 1958
16 Claims. (Cl. 313—7)

In the working of material by means of beams of charged particles, as for example, in drilling, milling, welding, soldering, brazing or surface treatment of materials, a precisely focussed beam of charged particles impinges upon the material to be worked and the energy thereof works the material. In such applications, it is necessary to regulate the working process, and such regulation is possible, in essence, only by optical observation. Since the dimensions in which the working process takes place are extremely small, a microscope having a magnification of approximately 20 to 100 times must be used for the observation.

If the working of the material consists of the drilling of the material, it is necessary to observe the production of a hole, the depth of which is many times its diameter. For this reason, the direction of the observation ray can only have a slight inclination with respect to the axis of the beam of charged particles. Further, an opening having a diameter of about 5 to 100 mm. must remain unimpeded for the passage of the beam of charged particles, therethrough, which opening, therefore, cannot be utilized for the optical observation. These requirements means that the distance between the object and the objective lens during operation must not be too small, in order that a sufficiently large area is available for the passage of the light. Furthermore, it is necessary to separate the objective lens from the worked material by a distance of at least 50 mm. to prevent rapid accumulation of evaporated material on the surface of this lens, rendering the lens opaque or reflective. Even in case of a larger separation between the material and the objective lens, means must be provided to protect said lens from impurities evaporated from the material. This means must allow an easy removal of the evaporated material accumulated on its surface. To effect adjustments of a cold workpiece, the observation device must include means for illuminating the workpiece from the top. During the actual working process, the work piece, in general, will become self-illuminating due to the heating resulting from the impingement of the beam of charged particles so that the observation during working can be effected without additional illumination.

In order to avoid injuring the observer by the X-ray radiation produced by the apparatus during working, it is also necessary that an X-ray protective glass of a thickness of 5–20 mm. be provided in the ray path of the observation device.

There is already known an observation device in apparatus for the working of material with a beam of charged particles in which an oblique mirror is arranged at about 100 mm. above the working point, this mirror extending inwards close to the beam of charged particles. By this mirror, an observation ray path which is inclined slightly with respect to the direction of the beam of charged particles is reflected in a direction perpendicular to the axis of the apparatus. In front of a window, which is arranged vacuum-tight in the wall of the apparatus, there is provided a microscope having a large working distance through which the object to be worked can be observed by means of the said mirror. It is also known to use a mirror which is inclined 45° with respect to the direction of the beam of charged particles, and which has a hole for the passage of the beam and, around this hole, takes in a conical pencil of light.

These known observation devices have the disadvantage that, on the one hand, they are not intended for direct illumination of the object and that, on the other hand, the thick window of X-ray protective glass in the vacuum wall of the apparatus is in a path of non-parallel rays and thus, in view of the high index of refraction of this glass, results in a considerable over-correction of the optical system of the microscope. In order to avoid image defects, it is necessary to counteract this over-correction by suitable means so that therefore a commercial microscope cannot be employed. Furthermore, the known observation devices have the disadvantage that an enlargement of more than about 40 times can be obtained only with great difficulty. This is due to the fact that the distance of the deflecting mirror from the working point is determined by the magnetic lens lying between, which lens serves to focus the beam of charged particles. Furthermore, the diameter of the vacuum vessel is already established so that the working distance of the microscope cannot be reduced.

Another disadvantage is that the mirror becomes dull very rapidly by evaporation onto same and must either be refinished or replaced by a new mirror after a relatively short time.

The device for the observation of the object in accordance with the present invention avoids all of the above-mentioned disadvantages and in addition to this results in a number of definite advantages of its own. This device also employs a microscope of large working distance, connected with apparatus for working the objects. In accordance with the present invention, however, a commercially available microscope having a parallel ray path behind the objective lens as seen in the direction of the light is used. The microscope objective lens is separated from the microscope stage and arranged in the apparatus itself, closed off by a glass window, preferably an X-ray protective glass. By this measure, the result is obtained that the working distance of the microscope is reduced so that therefore the magnification which can be obtained is correspondingly increased. Furthermore, the correction of the microscope lens system is not changed by the window of X-ray protective glass arranged in the parallel ray path.

If the light intensity coming from the object which is to be worked is sufficiently great, it is advantageous to use a known microprojection device rather than an observation microscope. By means of such a projection device, the tiring continuous observation through the microscope is replaced by the considerably simpler viewing of the projected image. In this way, premature fatigue on the part of the operator is avoided.

If a microprojection device cannot be used because the light intensity is too low, it is advisable to provide an image converter which is connected with the observation microscope and electronically amplifies and enlarges the optical image.

In many cases, it is also advantageous to connect the observation microscope in known manner with a television camera. The image produced by this camera is fed to a receiver and made visible on the picture screen of the latter. The observation is thus considerably simplified with this arrangement also. Furthermore, there is the possibility of setting up the receiver as well as the controls necessary for operating the working tool, separated in space from said apparatus so that remote control can be obtained. By such an arrangement, it is also made possible for one operator to supervise simultaneously several apparatus for the working of material.

It is advisable when using a television camera to replace the microscope eyepiece by a pancratic projective serving for the continuous adjustment of the image enlargement. By means of such a projective, the enlargement of the image can be varied within certain limits without changing the focussing. Furthermore, the light efficiency is greater than with the customary arrangement of the television camera behind the microscope eyepiece.

The microscope objective lens is provided with an axially centered bore and so arranged that its optical axis coincides with the axis of the beam of charged particles in order to conserve space. In this case, the observation mirror serving to deflect the light into the microscope stage is also bored and positioned behind the objective (seen in the direction of the light. A grounded tube extending through the bores of the objective and of the mirror, prevents the glass walls of the boreholes from becoming charged by stray electrons. Such a charging would bring about uncontrollable deflections of the beam of charged particles.

It is also within the scope of the invention to provide a beam-generating system which produces a beam the axis of which is inclined to the axis of the apparatus and the deflection of which beam into coincidence with the axis of the apparatus is effected by means of a magnetic deflecting system. The microscope objective is in this case arranged in the axis of the apparatus above said deflecting system. In this way, the result is obtained that the objective need not be drilled and accordingly a larger portion of the lens can be utilized for observation.

In order to protect the objective against evaporation onto same, a thin protective glass is applied on the object side. Although placed in the path of non-parallel rays, an overcorrection of the optical system of the microscope can be minimized by making the protective glass very thin. It is advantageous to arrange a plurality of such glasses in the high vacuum space in a magazine and to develop this magazine in such a manner that the glasses can easily be interchanged. Furthermore, it is possible to provide vacuum locks for the introduction and removal of such protective glasses under vacuum.

In order to prevent the protective glass from being covered by evaporation very rapidly and accordingly becoming useless during the working process proper in which a vigorous evaporation of the material being worked takes place, it is advisable to arrange in front of said glass a movable mask which can be swung into position during the working process and thereby screens the protective glass against the jets of vapor coming from the object.

The material which evaporates during the working process precipitates principally at places which can be struck directly by the vapor jet. If charged particles impinge on such layers which have been applied by evaporation and the electrical conductivity of which may be very small depending on the nature of the material being worked, electrostatic fields can be formed there which change the adjustment of the beam of charged particles.

In order to avoid such electrostatic charges, it is advantageous to arrange in the ray path of the beam of charged particles at least one screening device containing one opening for the passage of the beam, said device being shaped conically in the direction of the beam in such a manner that the surface thereof which faces the beam forms with it a larger angle than any jet of evaporated material passing from the working place to said surface. The surface of the screening device facing away from the beam forms a narrow angle with the beam of charged particles.

The conically developed part of the screening device is as long as possible with a thickness of material which is as small as possible. In this way, electrostatic charges which might possibly be built up on the surface of the screening device facing away from the beam are screened particularly well by the surface facing the beam. This means that the penetration of interference fields is so greatly reduced that these fields for all practical purposes are no longer active in the opening passed through by the beam.

The new observation device also includes a device for top illumination of the object. For this purpose, an illuminating system which supplies parallel light is provided. This parallel light strikes the objective which produces an image of the source of light in the object plane. It is also possible to obtain structureless illumination by producing a Kohler-ray path.

In order to avoid reflections and disturbing stray light, it is advisable to use for the illuminating ray path regions of the objective which are not used at the same time for the observation ray path. For this, there enters into consideration advantageously the outer zone of the objective. In this case an illuminating system which supplies an annular pencil of light as well as a mirror which deflects this pencil of light in the direction towards the object is provided. The inner zone of the objective serves in this connection for the observation.

In many cases it is advisable to employ a microscope for stereoscopic viewing in which two round ray pencils, located outside the optical axis, are used for the binocular ray path. These pencils of light strike only a part of the viewing mirror. The other region of the viewing mirror, displaced 90° with respect to these pencils of light, is then advantageously provided with recesses which serve for the passage of the illumination ray path.

In the case of observation by means of a microscope, it is advisable to arrange marks which are movable in the ray path. By the movement and adjustment of the markings, measurements on the material being worked can for instance be effected.

If instead of a viewing microscope, a microprojection device is employed, it is advantageous to arrange thermocouples in the image produced by projection. These thermocouples can be used to control the actual working process. For instance, it is possible to arrange a thermocouple in such a manner that it lies in the projected image at the place where the image of the incident beam of charged particles appears. If drilling is effected with such an arrangement, no radiation will strike the thermocouple any longer after the object has been drilled through and the thermocouple can disconnect the beam of charged particles, for instance via a relay. It is also possible, instead of thermocouples, to use photoelectric cells or other photoelectric receivers.

Since the intensity of the beam of charged particles serving for the working of the material is very high (for instance 20 kilowatts per square millimeter), parts of the apparatus might be damaged if this beam came out of adjustment. In order to avoid such damage, it is advantageous to shield such parts from inadvertent impingement of the beam thereon. The shield is preferably developed as a thick wall funnel provided with an opening for the passage of the beam and made of material of sufficient conductivity and heat-resistance to withstand beam impingement. By the funnel-shaped development of this shield or covering device, the result is obtained that upon coming out of adjustment the beam impinges upon said shield and distributes its intensity over a relatively large surface of this shield. In this way the activity of the beam is reduced to such an extent that only a heating of the covering device will take place. In order to make the funnel surface of the covering device facing the beam of charged particles as large as possible, it is advisable to develop it with a convex curvature.

The covering device can advantageously also assume the function of an electron optically active element, for instance of the beam delimiting aperture.

The invention will be explained in further detail by way of the embodiments illustrated in the accompanying drawings, in which.

Figure 1:
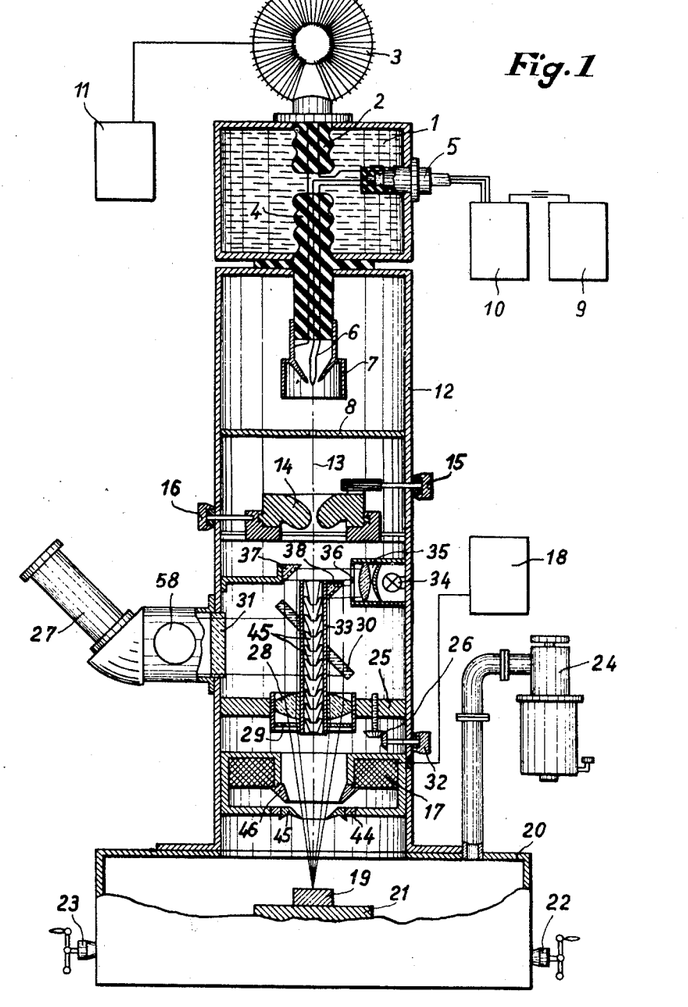
Figure 1 is a cross sectioned view of an apparatus for working objects by means of a beam of charged particles developed in accordance with the present invention.

In Fig. 1 there is shown an oil filled container 1, into which there dips an insulater protrusion 2 connected with an isolating transformer 3. An insulator 4 as well as a 3-wire high-voltage cable 5 also dips into the container 1. The insulator 4 carries the beam producing system consisting of a cathode 6 and a control electrode 7. The anode of the beam-generating system, which lies at ground potential, is designated 8.

An apparatus 9 serves to produce the high voltage required to operate the beam-generating system. This high voltage is fed to another apparatus 10 which serves to produce the bias voltage of the control electrode 7. The high voltage for the cathode 6 is fed directly to the cathode via the three-wire high voltage cable through the insulator 4. The bias voltage for the control electrode 7 is coupled through the secondary winding of the transformer 3, the primary winding of which is connected with an apparatus 11 for producing control pulses. By means of transformer 3, the control pulses produced at ground potential in the apparatus 11 are transferred to high voltage potential and superimposed on the control electrode bias voltage. In this way, an intermittent control of the beam generating system in synchronism with the control pulses applied by the apparatus 11 is obtained.

The beam generating system 6, 7, 8 is arranged in a container 12 which is under high vacuum and at ground potential. The electron beam 13 produced by this beam generating system passes through a diaphragm 14 which can be adjusted by means of the knobs 15 and 16. The diaphragm 14 is at the same time developed as shield or covering device which prevents injury to the parts of the apparatus arranged below it when the beam 13 goes out of adjustment. Furthermore, by this development of the diaphragm, assurance is had that the diaphragm will not melt if the beam goes out of adjustment. The diaphragm aperture therefore always remains constant.

An electromagnetic lens 17, the power supply of which is marked 18, serves to focus the electron beam 13 onto the object to be worked 19. This object is supported in a working space 20 on a compound table 21, not shown in detail. Two knobs 22 and 23 serve for the displacement of this compound table. The high voltage pumping installation connected with the apparatus is indicated by a diffusion pump 24.

For observation of the object 19 which is to be worked, there is used a stereomicroscope 27 which is connected with the housing 12. The microscope 27 has a large working distance and has a parallel ray path between the objective and the remaining members of the microscope. 58 is the operating knob of a magnification changer which makes it possible to observe the object 19 with different magnifications. The objective 28 of the microscope 27 is separated from the microscope housing proper and arranged in the housing 12. In front of the objective 28, there is a glass plate 29 which protects the objective from the evaporation of the material.

The light proceeding from the surface of the object 19 during working passes through the electromagnetic lens 17 and the covering plate 29 into the objective 28. This objective is supported together with the plate 29 in a ring 25 which can be adjusted vertically for focussing by a knob 32 via a gearing 26. When correctly focussed, as can be noted in particular from the enlarged showing of the viewing device in Fig. 2, the light passing through the objective 28 is parallel and is finally projected via a viewing mirror 30 through a plate 31 of X-ray protective glass into the microscope housing 27.

Figure 2:
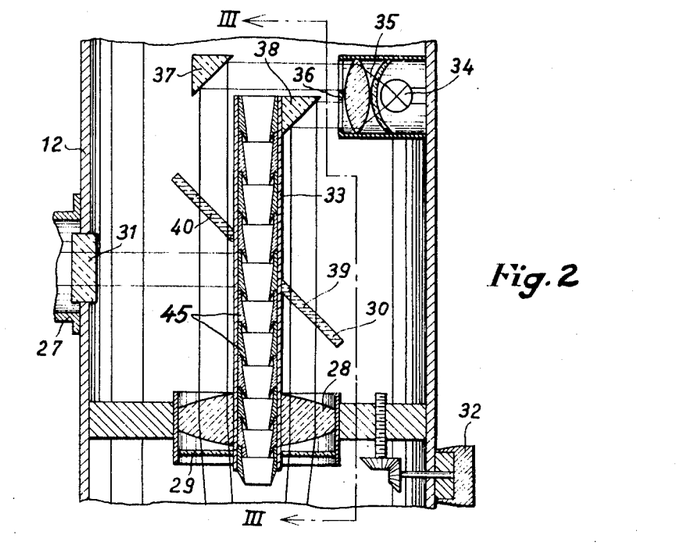
Figure 2 is an enlarged sectional view of a portion of the apparatus shown in Fig. 1.

The parts 28, 29 and 30 are bored in their center in order to permit the passage of the electron beam 13. In this bore, there is arranged a grounded tube 33 which protects the glass walls of the bores of the said parts from becoming charged by stray electrons.

In order, furthermore, to prevent electrostatic interference fields being produced in said tube itself as a result of insulating layers evaporated thereon, a plurality of screening devices 45 are arranged one above the other in the tube 33. By these devices, the result is obtained that there are not produced in the tube 33 any evaporated layers which are struck by the electron beam. All the surfaces on which evaporated layers build up are screened electrically from the electron beam. Spurious deflection of the electron beam 13 within the range of the entire observation system is therefore avoided in the apparatus shown.

For illuminating the surface of the workpiece, there is provided a lamp 34 which produces parallel light via a condenser 35. This light is split by a diaphragm 36 into two separate pencils of light. The two pencils of light are deflected by two prisms 37 and 38 and finally pass through recesses in the mirror 30 into the objective 28. The two pencils of light are focussed onto the surface of the workpiece by the objective 28. The recesses of the mirror 30 are produced by boring through the mirror at two points or not silvering it at these two points.

Figure 3:
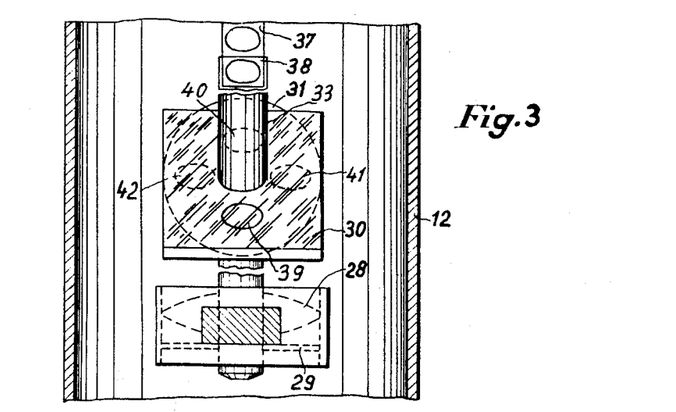
Figure 3 is a section taken along line III—III of Fig. 2.

These conditions can be more easily noted from Fig. 3, which shows a section along the line III—III of Fig. 2. In this figure, the two recesses of the mirror 30, serving for the passage of the illuminating beam path, are designated 39 and 40. The two points of the mirror 30 serving for deflecting the viewing beam path into the microscope housing 27 are designated 41 and 42.

It is advantageous to combine the entire observation device as well as the magnetic lens 17 structurally into a single unit. In this case, however, the mount of the protective glass is not easily accessible. The removal of this glass can in this case be facilitated in the manner that its mount, together with the protective glass, can be pulled out at right angles to the direction of the electron beam through an opening in the vacuum wall which is connected with an air lock.

The lower pole shoe 44 of the electromagnetic lens 17 is advisedly also provided with a screening device 45. This screening device prevents the production of vapordeposited layers on the upper pole shoe 46 and in part also on the covering plate 29.

Figure 4:
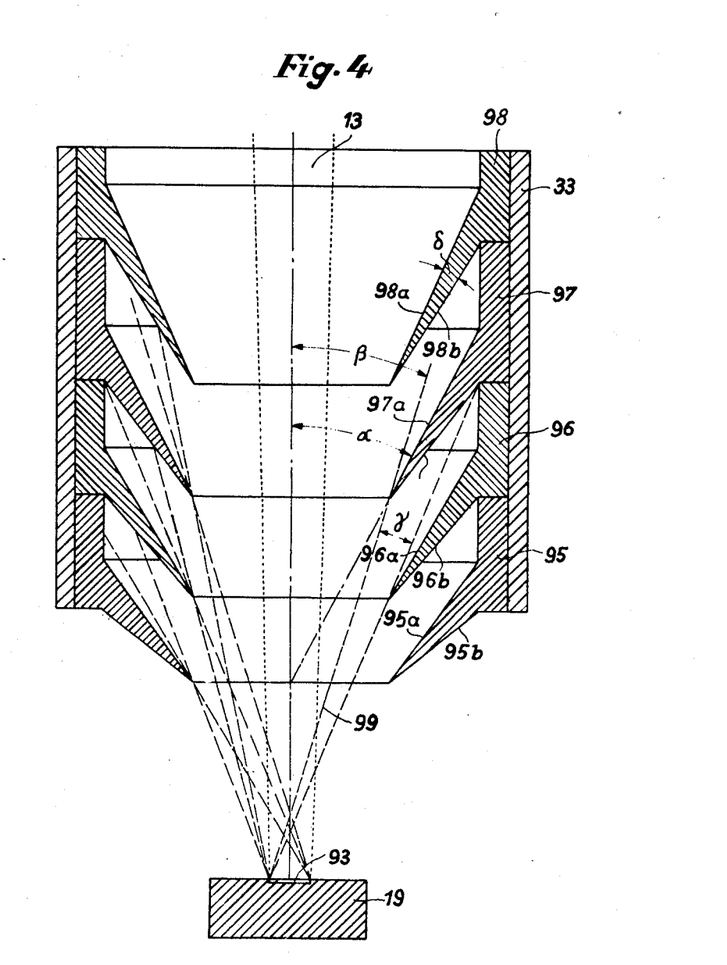
Figure 4 is an enlarged sectional view of the screening device of Figs. 1 and 2.

Fig. 4 shows a part of the tube 33 shown in Figs. 1 and 2, on a larger scale. For clarity of explanation, all structural parts located between the tube 33 and the object 19 have been omitted. The screening devices arranged in the tube 33, which are marked 45 in Fig. 1, here bear the reference numbers 95, 96, 97 and 98 so that they may be more easily distinguished. These diaphragms are so shaped conically in the beam direction that their surfaces 95a, 96a, 97a, 98a facing the beam 13 form with the latter a larger angle than any jet of vaporized material (shown in dotted line) passing to the diaphragms from the working place 93 and that their surfaces 95b, 96b, 97b, 98b facing the object 19 form an acute angle with the beam 13.

These conditions will be explained in further detail with reference to the diaphragm 97. The surface 97a facing the beam 13 forms with the latter an angle α which is larger than the angle β formed by the jet of vaporized material 99 extending from the edge of the working point 93 with the beam 13. In this way the result is obtained that none of the jets of vaporized material extending from the working place 93 strikes the surface 97a. The jets of vaporized material rather strike merely on the surface 97b facing the object 19 and form there a vaporized layer. The electric conductivity of the deposited layer may be very poor, depending on the nature of the material of the workpiece 19. The entire screening device is made of material of good electric conductivity, for instance of brass, and lies at ground potential.

If the layer deposited on the surface of 97b by vaporization is now charged by stray charged particles, these charges, as can be noted directly from Fig. 4, will be screened by the surface 97a from the beam 13. An electrostatic field is formed between the surfaces 97b and 96a, the penetration of which on the opening traversed by the beam is so greatly reduced by the physical arrangement of the diaphragm that this field cannot cause any undesired deflection of the beam 13.

It is advisable to make the angle δ between the surface of each screening device facing the beam and the surface facing away from the beam as small as possible. As a result of this, the screening effect is particularly good.

Regulation of the portion of the jet of vaporized material striking the surfaces 95b to 98b can be regulated by dimensioning of the space angle γ and the distance between the individual devices 95 to 98. The number of screening devices depends on the length of the path of the beam of charged particles which is to be screened. This also applies for jets of vaporized materials the particles of which are not electrically or magnetically neutral and which move over a non-linear path under the influence of an electromagnetic field.

Figure 5:
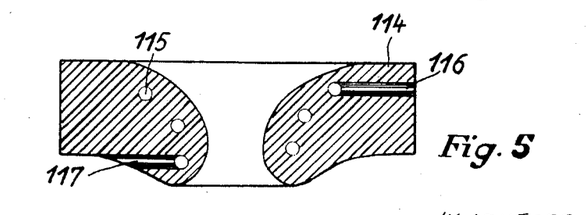
Figure 5 is a sectional view of another embodiment of the covering device contained in the apparatus shown in Fig. 1.

Fig. 5 shows another embodiment of a covering device which can be used, for instance, instead of the diaphragm 14 shown in Fig. 1. The covering device 114 shown here is provided with channels 115 which serve for the passage of a coolant. As a coolant, water, for instance, may be used. The coolant inlet is marked 116 and the coolant outlet 117. The covering device 114 is used in particular when operating with a beam of charged particles of high intensity.

The covering devices shown in Figs. 1 and 5 can be used in an apparatus for working material by means of a beam of charged particles, not only at the places indicated in Fig. 1, but, to advantage, wherever structural parts are to be protected from destruction by the beam of charged particles.

Figure 6:
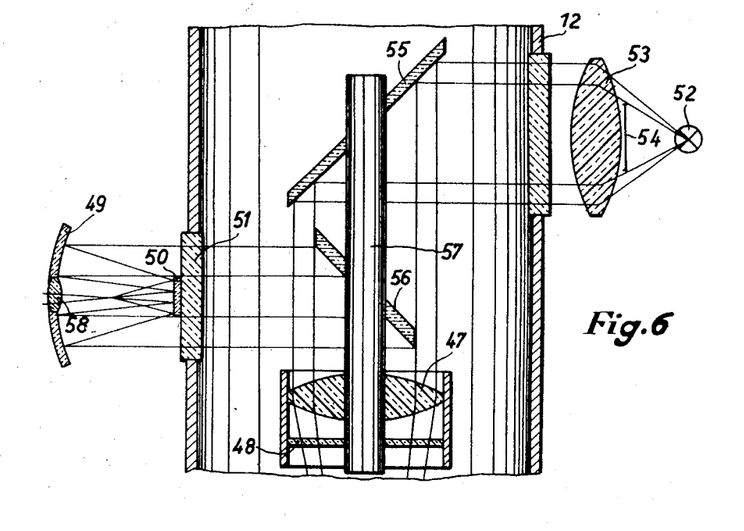
Figure 6 is a sectioned view of another embodiment of the observation device in accordance with the invention.

In Fig. 6, there is shown another embodiment of the observation device in accordance with the invention. In this case, there is used for the observation a monocular microscope which again has a large working distance, and the objective of which is separated from the microscope stage and installed in the apparatus itself. The microscope objective is marked 47 in Fig. 6 and the glass protective plate arranged in front of said objective bears the reference number 48. The part of the microscope remaining in the microscope stage consists of a hollow mirror 49, a flat mirror 50 and an eyepiece 58. By means of the mirrors 49 and 50, there is produced an intermediate image of the object under observation and this intermediate image is observed by means of the eyepiece 58. In front of the mirror 49, there is arranged a plate 51 of X-ray protective glass. This plate is in the parallel ray path and accordingly does not influence the correction of the microscope optical lens system.

For the illuminating of the surface of the workpiece, there is used, in the observation arrangement shown in Fig. 6, a lamp 52 which produces parallel light via a condenser 53. A diaphragm 54 serves to remove the central part of the light so that an annular pencil of light is produced by the illuminating device. This pencil of light is deflected by a mirror 55 and focussed by the objective 47 onto the surface of the workpiece. The light proceeding from the surface of the workpiece is directed parallel through the objective 47 and deflected by a mirror 56 into the viewing microscope 49, 50, 58.

The parts 47, 58, 55 and 56 are bored through in their center, and through this bore there is passed a grounded tube 57 which serves for the passage of the electron beam. This tube also, is advantageously provided with the screening device marked 45 in Fig. 1.

Figure 7:
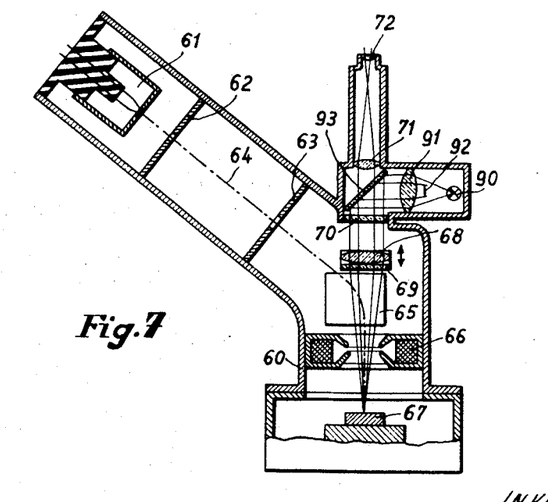
Figure 7 is a sectioned view of another embodiment of the observation device in accordance with the invention.

In Fig. 7, there is shown a further embodiment of the observation device in accordance with the invention in which the microscope objective arranged in the apparatus itself does not need to be bored through. 61 is a beam generating system consisting of a cathode and a control electrode, the anode of which system bears the reference number 62. In front of the anode, there is arranged a displaceable diaphragm 63. By means of this beam-generating system, there is produced an electron beam 64, the axis of which is inclined with respect to the axis of the apparatus part 60. The beam 64 is deflected by a magnetic deflection system 65 into coincidence with the axis of the apparatus and focussed by an electromagnetic lens 66 on the workpiece 67 to be worked. Along the axis of the apparatus and above the deflection system 65, there is arranged a microscope objective 68 which is displaceable vertically for purposes of focussing. This objective is provided with a protective glass 69. An X-ray protective glass 70 serves for closing off the apparatus 60. The optical elements remaining in the microscope stage are designated 71 and 72. These elements act as telescope by which the image of the workpiece surface 67 focussed on infinity by the objective 68 is observed.

As can be noted from Fig. 7, the microscope objective 68 need not be bored through in this case, since it is not traversed by the electron beam 64. Thus a larger region of the microscope objective is available for observation.

For the illuminating of the workpiece 67, there is employed a source of light and a condenser 91.

A central diaphragm 92 serves for masking out the central part of the light so that an annular pencil of light is produced by the illuminating device. This pencil of parallel light is reflected via a mirror 93 and passes through the X-ray protective glass 17 into the inside of the apparatus 60. There the pencil of light is focussed by the objective 68 onto the workpiece 67.

Figure 8:
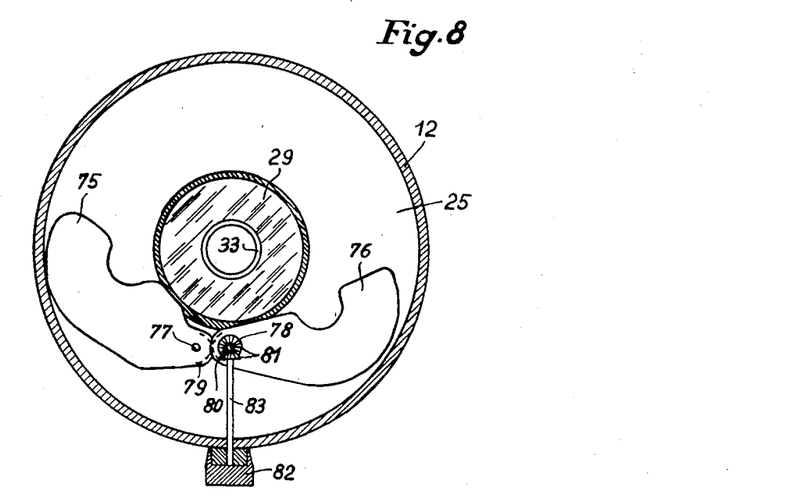
Figure 8 is a bottom view of a masking diaphragm serving for the masking of the microscope objective.

Fig. 8 shows the microscope objective 28 of Figs. 1 and 2 with associated protective glass plate 29 in bottom view. In this embodiment, however, a screening diaphragm consisting of two segments 75 and 76 is provided. This screening diaphragm serves to protect the glass plate 29 from excessively strong vaporizing of material onto it during the working process. The segment 75 is turnable about a shaft 77 and the segment 76 about a shaft 78. These shafts are supported in the ring 25 so that therefore the screening diaphragm can be adjusted vertically together with the objective. On the shaft 78 there is arranged a gear 81 which is actuated by means of a knob 82. The shaft 83 is advisedly developed as a flexible shaft so that the screening diaphragm can be vertically adjusted. The segments 75 and 76 are developed at their facing ends as gears 79 and 80 respectively which engage with each other. By actuation of the knob 82, the segments 75 and 76 are turned toward each other via the gear 81 and the gears 79, 80 until they cover the glass plate 29.

Figure 9:
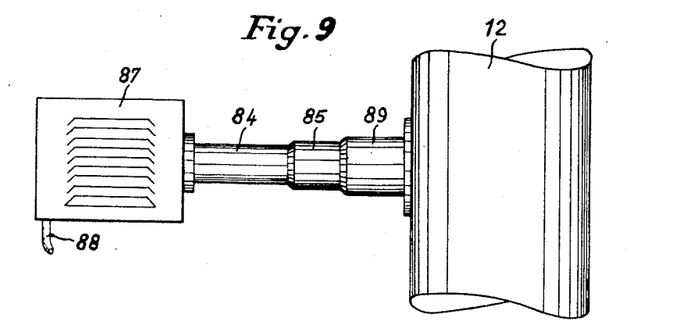
Figure 9 is an elevation of the viewing microscope with a televson camera.

In Fig. 9, there is shown a monocular viewing microscope 89 connected with the high vacuum housing 12. The objective of this microscope is arranged in the housing 12. The eyepiece of this microscope is replaced by a pancratic projective 84. By turning a ring 85, the image magnification can be varied within certain limits without it being necessary to change the focus. This projective produces on the photocathode of the camera tube, arranged in a television camera 87, an image which has exactly the size of this photocathode. The electric signals supplied by the television camera 87 are led away via a cable 88 and fed there to a receiver.

On the picture screen of said receiver, the picture of the workpiece being worked can be observed.

Instead of the television camera shown in Fig. 9, the viewing microscope can also be connected with an image converter. Furthermore, it is possible to replace the viewing microscope 89 by a microprojection device known per se.

We claim:

1. In an apparatus for working materials by means of a beam of charged particles consisting of a high-vacuum vessel containing the beam producing system, means for forming and focussing the produced beam and a working space in which the object to be worked is arranged, a device for observing said object, said device comprising a microscope of large working distance connected to said high-vacuum vessel, said microscope having, as seen in the direction of light, a parallel ray path behind its objective lens, said objective lens being separated from the microscope stage and mounted in said high-vacuum vessel, an X-ray protective glass arranged in the wall of said vessel in front of said microscope stage, and means for transmitting the light rays originating from said object after passing through said objective lens into said microscope stage.

2. An apparatus according to claim 1 in which said means for transmitting the light rays to said microscope stage consist of a mirror arranged behind said objective lens, as seen in the direction of light, and in which said objective lens is arranged within said high-vacuum vessel in such a manner that its optical axis coincides with the axis of said beam of charged particles, said objective lens and said mirror including an axially aligned bore allowing said beam to pass through it.

3. An apparatus according to claim 1 in which that part of said high-vacuum vessel which includes the beam producing system is inclined to that part which includes the means for focussing the beam and the object to be worked, said apparatus further comprising a magnetic deflection system to deflect the beam of charged particles produced in said first part of the high-vacuum vessel into the axis of said second part, the objective lens of said microscope being arranged within said second part above said deflection system in such a manner that its optical axis coincides with the axis of said deflected beam of charged particles and with the axis of said microscope stage.

4. An apparatus according to claim 1 further comprising a microprojection device coupled to said microscope.

5. An apparatus according to claim 1 further comprising a television camera coupled to said microscope.

6. An apparatus according to claim 1 in which said microscope is a stereo-microscope.

7. An apparatus according to claim 1 further comprising a thin protective glass plate positioned in front of said objective lens, as seen in the direction of light.

8. An apparatus according to claim 1 further comprising a thin protective glass plate positioned in front of said objective lens, as seen in the direction of light, and a screening diaphragm rotatably positioned in front of said protective glass, said diaphragm being selectably movable in masking relationship to said protective glass.

9. An apparatus according to claim 2 which includes a grounded tube, serving for the passage of the beam of charged particles and positioned within said bores of said objective lens and said mirror.

10. An apparatus according to claim 2 further comprising a grounded tube serving for the passage of the beam of charged particles and positioned within said bores of said objective lens and said mirror, and at least one screening device arranged within said tube, said screening device having an aperture therein for the passage of said beam of charged particles therethrough and being so shaped conically in the direction of said beam that its surface facing the beam forms with the latter a larger angle than any jet of vaporized material originating from the working point of said object to be worked, that surface of said screening device faced away from the beam forming an acute angle with said beam of charged particles.

11. An apparatus according to claim 2 further comprising a grounded tube serving for the passage of the beam of charged particles and positioned within said bores of said objective lens and said mirror, and a plurality of screening devices arranged one above the other within said tube, each of said screening devices having an aperture therein for the passage of said beam of charged particles therethrough and being so shaped conically in the direction of said beam that its surface facing the beam forms with the latter a larger angle than any jet of vaporized material originating from the working point of said object to be worked, that surface of said screening device faced away from the beam forming an acute angle with said beam of charged particles.

12. An apparatus according to claim 1 further comprising an illuminating system which supplies parallel light and is arranged above said objective lens, said parallel light being focussed by said objective lens onto said object to be worked.

13. An apparatus according to claim 1 further comprising an illuminating system adapted to an annular pencil of parallel light, said system being arranged above said objective lens, and a mirror arranged between said illuminating system and said objective lens and adapted to deflect said pencil of light toward said objective lens, said lens focussing said light onto said object to be worked.

14. An apparatus according to claim 2 in which said microscope is a stereo-microscope and which further comprises an illuminating system positioned above said microscope objective lens, said system being adapted to two separate pencils of parallel light, a mirror adapted to deflect said two pencils of light toward said objective lens, and two recesses in said mirror serving for transmitting the light emanating from the object to be worked to said microscope stage, said recesses serving for the passage of said illuminating light pencils, said objective lens focussing said light pencils onto said object to be worked.

15. An apparatus according to claim 1 further comprising at least one covering device of heat-conductive and heat-resistant material being arranged in front of those apparatus parts which lie within the region of possible beam impingement during maladjustment of said beam of charged particles in order to shield those parts, said covering device being developed as a thick-walled funnel and provided with a beam passage opening, said funnel surface of said device which faces the beam of charged particles being of convex curvature.

16. An apparatus according to claim 1 further comprising a covering device of heat-conductive and heat-resistant material, said device being arranged between said beam producing system and said means for focussing said beam of charged particles and serving for forming said beam, said covering device being further developed as a thick-walled funnel and provided with a beam passage opening, said funnel surface of said device which faces the beam of charged particles being of convex curvature.

No references cited.

UNITED STATES PATENT OFFICE

CERTIFICATION OF CORRECTION

Patent No. 2,944,172                      July 5, 1960

Wolfgang Opitz et al

It is hereby certified that error appears in the above numbered patent requiring correction and that the said Letters Patent should read as corrected below.

In the grant, lines 1, 2, 3, and 4, and in the heading to the printed specification, lines 5, 6, 7, 8 and 9, for "Wurttemberg" read -- Wuerttemberg --; column 5, line 22, after "elevation" insert -- view --; line 23, for "televson" read -- television --; line 25, for "insulater" read -- insulator --; line 37, after "high voltage cable" insert -- 5 --; column 8, line 14, for "58" read -- 48 --.

Signed and sealed this 25th day of April 1961.

(SEAL)
Attest:

ERNEST W. SWIDER
Attesting Officer

DAVID L. LADD
Commissioner of Patents